United States Patent
Kim et al.

(10) Patent No.: US 10,801,758 B2
(45) Date of Patent: Oct. 13, 2020

(54) ACCUMULATOR FIXING DEVICE FOR COMPRESSOR, AND AIR-CONDITIONING APPARATUS INCLUDING SAME

(71) Applicant: Samsung Electronics Co., Ltd, Gyeonggi-do (KR)

(72) Inventors: Seon-kyo Kim, Seoul (KR); Bum-young Byun, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 277 days.

(21) Appl. No.: 15/759,144

(22) PCT Filed: Aug. 16, 2016

(86) PCT No.: PCT/KR2016/008952
§ 371 (c)(1),
(2) Date: Mar. 9, 2018

(87) PCT Pub. No.: WO2017/047934
PCT Pub. Date: Mar. 23, 2017

(65) Prior Publication Data
US 2019/0056156 A1 Feb. 21, 2019

(30) Foreign Application Priority Data

Sep. 16, 2015 (KR) .................. 10-2015-0131134

(51) Int. Cl.
*F24F 1/08* (2011.01)
*F25B 31/00* (2006.01)
(Continued)

(52) U.S. Cl.
CPC .............. *F25B 31/00* (2013.01); *F04B 39/00* (2013.01); *F04B 41/02* (2013.01); *F24F 1/08* (2013.01);
(Continued)

(58) Field of Classification Search
CPC ........ F24F 1/40; F25B 2500/13; F25B 43/006
See application file for complete search history.

(56) References Cited

U.S. PATENT DOCUMENTS 4,429,544 A * 2/1984 McCarty ............... F25B 43/006
62/324.1
4,474,035 A 10/1984 Amin et al.
(Continued)

FOREIGN PATENT DOCUMENTS

CN 1510286 A 7/2004
CN 2871972 Y 2/2007
(Continued)

OTHER PUBLICATIONS

China National Intellectual Property Administration, "The First Office Action," Application No. CN 201680054116.0, dated Oct. 11, 2019, 22 pages.
(Continued)

*Primary Examiner* — Filip Zec

(57) ABSTRACT

Disclosed are: an accumulator fixing device for a compressor, the device being capable of minimizing the generation of vibration and noise; and an air-conditioning apparatus including the same. The disclosed accumulator fixing device comprises: fixing members fixedly provided to an outer side of a compressor; a first supporting member fixing a portion of the accumulator together with the fixing member while encompassing the circumference thereof; and a second supporting member fixing another portion of the accumulator together with the fixing member while encompassing the same, wherein the first supporting member and the second supporting member are arranged to be spaced from each other by a preset gap.

12 Claims, 17 Drawing Sheets

(51) Int. Cl.
   *F25B 43/00*   (2006.01)
   *F04B 39/00*   (2006.01)
   *F24F 1/40*    (2011.01)
   *F04B 41/02*   (2006.01)

(52) U.S. Cl.
   CPC ............... *F24F 1/40* (2013.01); *F25B 43/00* (2013.01); *F25B 43/006* (2013.01); *F04C 2240/804* (2013.01); *F04C 2240/805* (2013.01); *F25B 2400/07* (2013.01); *F25B 2500/13* (2013.01)

(56) References Cited

U.S. PATENT DOCUMENTS

| | | | | |
|---|---|---|---|---|
| 4,888,962 | A * | 12/1989 | Harper | F16B 2/065 62/503 |
| 5,701,759 | A * | 12/1997 | Boehme | F25B 43/006 220/23.87 |
| 5,873,261 | A * | 2/1999 | Bae | F04C 23/008 62/503 |
| 6,220,050 | B1 * | 4/2001 | Cooksey | F04B 39/0061 62/503 |
| 6,378,327 | B1 * | 4/2002 | Corrigan | B60H 1/3229 62/239 |
| 6,701,745 | B1 | 3/2004 | Kozinski | |
| 7,386,991 | B2 | 6/2008 | Kim et al. | |
| 10,011,155 | B2 * | 7/2018 | Koberstein | F24F 1/26 |

FOREIGN PATENT DOCUMENTS

| | | |
|---|---|---|
| CN | 201747608 U | 2/2011 |
| CN | 104457051 A | 3/2015 |
| JP | 2009002201 A | 1/2009 |
| JP | 2012-57467 A | 3/2012 |
| KR | 20-1999-0036037 U | 9/1999 |
| KR | 20-1999-0036039 U | 9/1999 |
| KR | 10-2001-0004767 A | 1/2001 |
| KR | 10-2002-0056242 A | 7/2002 |
| KR | 10-2002-0094773 A | 12/2002 |
| KR | 10-2004-0022656 A | 3/2004 |
| KR | 10-2004-0023070 A | 3/2004 |
| KR | 10-0504908 B1 | 7/2005 |
| KR | 10-0741802 B1 | 7/2007 |

OTHER PUBLICATIONS

International Search Report dated Nov. 22, 2016 in connection with International Patent Application No. PCT/KR2016/008952.
Written Opinion of the International Searching Authority dated Nov. 22, 2016 in connection with International Patent Application No. PCT/KR2016/008952.
European Patent Office, "Supplementary European Search Report," Application No. EP 16846755.3, dated Jun. 1, 2018, 7 pages.
Office Action dated Apr. 16, 2020 in connection with Chinese Patent Application No. 201680054116.0, 15 pages
Communication pursuant to Article 94(3) EPC dated Apr. 2, 2020 in connection with European Patent Application No. 16 846 755.3, 5 pages.

\* cited by examiner

ACCUMULATOR FIXING DEVICE FOR COMPRESSOR, AND AIR-CONDITIONING APPARATUS INCLUDING SAME

CROSS-REFERENCE TO RELATED APPLICATION(S) AND CLAIM OF PRIORITY

This application is a 371 of International Application No. PCT/KR2016/008952 filed Aug. 16, 2016, which claims priority to Korean Patent Application No. 10-2015-0131134 filed Sep. 16, 2015, the disclosures of which are herein incorporated by reference into their entirety.

TECHNICAL FIELD

The present disclosure relates to an accumulator fixing device for a compressor and an air-conditioning apparatus including the same, and more particularly, to an accumulator fixing device for a compressor capable of minimizing an occurrence of vibration and noise by fixing an accumulator to the compressor, and an air-conditioning apparatus including the same.

BACKGROUND

In general, a compressor, which is a portion of a refrigeration cycle apparatus, is an apparatus for pressurizing a refrigerant to change the pressure and temperature of the refrigerant to be suitable for a predetermined purpose. The refrigeration cycle apparatus is configured to include a compressor, a condenser, an expansion means, and an evaporator, and the respective components are connected to each other to form a closed cycle.

Such a refrigeration cycle apparatus compresses the refrigerant of a low temperature and low pressure state which is sucked into the compressor and discharges the compressed refrigerant in a high temperature and high pressure state. The discharged refrigerant is transformed into a liquid state by discharging a latent heat to the outside while passing through the condenser, and the pressure of the discharged refrigerant is decreased while passing through the expansion means. Next, while the refrigerant passes though the evaporator, the refrigerant of the low pressure state is evaporated to absorb external heat, and a process of re-introducing the evaporated refrigerant into the compressor is repeated.

The refrigeration cycle apparatus is mounted in an air-conditioning unit (air-conditioner) or a refrigerator to pleasantly keep an indoor or to freshly keep foods using cool air and hot air which are formed from the condenser and the evaporator.

Meanwhile, in a case in which the refrigerant of the liquid state which is not evaporated in the process of introducing the refrigerant passing through the evaporator of the refrigeration cycle apparatus is introduced into the compressor is introduced into the compressor, abnormal explosion noise occurs in the compressor.

In order to prevent such a phenomenon, an accumulator for evaporating the refrigerant of the liquid state or preventing an impurity introduction before the refrigerant passing through the evaporator is introduced into the compressor is mounted.

SUMMARY

An object of the present disclosure is to provide an apparatus capable of easily coupling a compressor and an accumulator to each other.

Another object of the present disclosure is to reduce vibrations of a compressor and an accumulator.

According to an aspect of the present disclosure, an accumulator fixing device for a compressor includes a fixing member configured to be installed to be fixed to an outer surface of the compressor; a first supporting member configured to fix one portion of an accumulator while surrounding a circumference of the accumulator together with the fixing member; and a second supporting member configured to fix another portion of the accumulator while surrounding another portion of the accumulator together with the fixing member, wherein the first supporting member and the second supporting member are disposed to be spaced apart from each other by a predetermined interval.

The fixing member may include first fixing members each fastened to opposite sides of the first supporting member; and second fixing members each fastened to opposite sides of the second supporting member and disposed to be spaced apart from the first fixing members along a length direction of the compressor.

The compressor may have an inlet port into which a fluid is introduced from the accumulator, the first supporting member may be disposed above the second supporting member, and a distance between the first fixing member and the second fixing member may be a distance spaced by 20% to 80% of a distance between the first fixing member and the inlet port.

The first fixing member and the second fixing member may be disposed on a virtual line disposed along the length direction of the compressor.

The first fixing members may have a first main fixing portion fixed onto an outer circumferential surface of the compressor; and first auxiliary fixing portions each extending from opposite sides of the first main fixing portion and protruding toward the accumulator, and the second fixing members may have a second main fixing portion fixed onto the outer circumferential surface of the compressor; and second auxiliary fixing portions each extending from opposite sides of the second main fixing portion and protruding toward the accumulator.

The first auxiliary fixing portions may have a first auxiliary vertical fixing portion which is vertically connected to the first main fixing portion; and a first auxiliary horizontal fixing portion which is connected to the first auxiliary vertical fixing portion and is in contact with the outer circumferential surface of the accumulator, and the second auxiliary fixing portions may have a second auxiliary vertical fixing portion which is vertically connected to the second main fixing portion; and a second auxiliary horizontal fixing portion which is connected to the second auxiliary vertical fixing portion and is in contact with the outer circumferential surface of the accumulator.

The first auxiliary fixing portion disposed at one side of the first fixing portion may have a first protruding portion connected to the first auxiliary horizontal fixing portion and protruding toward the compressor, and the first auxiliary fixing portion disposed at the other side of the first fixing portion may have a first fastening portion protruding toward the compressor and connected to the first auxiliary horizontal fixing portion and having a first fastening hole penetrating through the first fastening portion along a thickness direction of the first fastening portion, and the second auxiliary fixing portion disposed at one side of the second fixing portion may have a second protruding portion connected to the second auxiliary horizontal fixing portion and protruding toward the compressor, and the second auxiliary fixing portion disposed at the other side of the second fixing portion may have a second fastening portion protruding toward the compressor and connected to the second auxiliary horizontal fixing portion and having a second fastening hole penetrating through the second fastening portion along a thickness direction of the second fastening portion.

A first catching hole protruding toward the accumulator and fixed to the first protruding portion may be formed at one side of the first supporting member, and the other side of the first supporting member may have a first coupling portion bent to opposite to the first fastening portion and having a first coupling hole corresponding to the first fastening hole, and a second catching hole protruding toward the accumulator and fixed to the second protruding portion may be formed at one side of the second supporting member, and the other side of the second supporting member may have a second coupling portion bent to opposite to the second fastening portion and having a second coupling hole corresponding to the second fastening hole.

The first auxiliary horizontal fixing portion may have first protruding portions each connected to one side and the other side of the first auxiliary horizontal fixing portion and protruding toward the compressor, and the second auxiliary horizontal fixing portion may have second protruding portions each connected to one side and the other side of the second auxiliary horizontal fixing portion and protruding toward the compressor, and first catching holes each protruding toward the accumulator and each fixed to the first protruding portions may be formed in one side and the other side of the first supporting member, and second catching holes each protruding toward the accumulator and each fixed to the second protruding portions may be formed in one side and the other side of the second supporting member.

The accumulator fixing device for a compressor may further include anti-vibration member configured to have a first upper fixing portion inserted and fixed into a first installing hole penetrating through the first auxiliary fixing portion along a thickness direction of the first auxiliary fixing portion, and a first lower fixing portion which is connected to the first upper fixing portion and is closely in contact with the outer circumferential surface of the accumulator.

A width of the first fixing member may be 40% or less of a distance between the first fixing member and the inlet port.

The accumulator fixing device for a compressor may further include an anti-vibration member configured to be interposed between the first supporting member and the accumulator and be closely in contact with the outer circumferential surface of the accumulator.

Thicknesses of the first supporting member and the second supporting member may be 1 to 5T.

The first supporting member and the second supporting member may be formed of any one of cold rolled steel, hot rolled steel, stainless, and a steel based material, or an alloy material thereof.

The first supporting member may have a shape in which a cross-sectional area is increased toward a central portion thereof.

The first supporting member may have a convex portion protruding along a width direction o the first supporting member.

The fixing member may include first fixing members each fastened to opposite sides of the first supporting member; second fixing members disposed to be spaced apart from the first fixing members and each fastened to opposite sides of the second supporting member; and connection members each connected to the first fixing members and the second fixing members and fixed onto an outer circumferential surface of the compressor.

According to an aspect of the present disclosure, an air-conditioning apparatus includes a compressor; a condenser configured to condense a refrigerant introduced from the compressor; an evaporator configured to cool surrounding air using evaporated latent heat of the refrigerant introduced from the condenser; an accumulator configured to provide a refrigerant of a vapor state to the compressor; and an accumulator fixing device for a compressor configured to fix the accumulator and the compressor to each other, wherein the accumulator fixing device for a compressor includes a fixing member configured to be installed to be fixed to an outer surface of the compressor, a first supporting member configured to fix one portion of the accumulator while surrounding a circumference of the accumulator together with the fixing member, and a second supporting member configured to fix another portion of the accumulator while surrounding another portion of the accumulator together with the fixing member, and the first supporting member and the second supporting member are disposed to be spaced apart from each other by a predetermined interval.

The fixing member may include first fixing members each fastened to opposite sides of the first supporting member; and second fixing members each fastened to opposite sides of the second supporting member and disposed to be spaced apart from the first fixing members along a length direction of the compressor.

The compressor may have an inlet port into which a fluid is introduced from the accumulator, the first supporting member may be disposed above the second supporting member, and a distance between the first fixing member and the second fixing member may be 70% or less of a distance between the first fixing member and the inlet port.

Advantageous Effects

It is possible to provide the accumulator fixing device for the compressor capable of effectively reducing the noise and vibration occurring during the operation of the compressor.

Further, it is possible to pleasantly keep the indoor or freshly keep the foods by preventing the damage on the connection pipe of the accumulator due to the vibration.

DETAILED DESCRIPTION

Hereinafter, an exemplary embodiment of the present disclosure will be described in detail with reference to the accompanying drawings. It is to be understood that exemplary embodiments described below are illustratively provided to facilitate understanding of the present disclosure, and the present disclosure may be variously modified and embodied other than the exemplary embodiments described herein. However, in describing the present disclosure, a detailed description of known functions and components incorporated herein will be omitted when it may make the subject matter of the present disclosure unclear. In addition, the accompanying drawings are not drawn to scale to facilitate understanding of the present disclosure, but the dimensions of some of the components may be exaggerated.

The first fixing member 30A and a second fixing member 30B may be disposed to be parallel to each other on a virtual line ℓC disposed along a length direction of a compressor 10. Further, the first fixing member 30A is installed above the second fixing member 30B.

For example, an inlet port 11 into which a fluid (refrigerant) is introduced from an accumulator 20 is provided to a lower portion of one side of the compressor 10. The first fixing member 30A and the second fixing member 30B may be disposed so that a distance $D_A$ therebetween is 20% to 80% or less ($D_A/D_B$) based on a distance $D_B$ between the first fixing member 30A and the inlet port 11.

When the first fixing member 30A and the second fixing member 30B are disposed so that ($D_A/D_B$) is less than 20%, a noise removal effect is inadequate as compared to a case in which one fixing member is installed. Further, when the first fixing member 30A and the second fixing member 30B are disposed so that ($D_A/D_B$) exceeds 80%, there is a problem that it is difficult to perform a work (e.g., a welding work) of fixing the first fixing member 30A and the second fixing member 30B each having a predetermined width to the compressor.

Although the exemplary embodiment describes a twin type having two inlet ports 11 by way of example, the inlet port 11 disposed at the uppermost portion is set as a reference of the distance in a case in which one inlet port 11 or three or more inlet ports 11 are formed.

Further, the reference of the distance may be based on the inlet port 11 and the centers of the first and second fixing members 30A and 30B. Therefore, it is possible to minimize noise by optimizing positions of the first fixing member 30A and the second fixing member 30B installed in the compressor 10.

Meanwhile, the first fixing member 30A and the second fixing member 30B have the same structure as each other, and a first supporting member 40A and a second supporting member 40B have the same structure as each other. Therefore, the first fixing member 30A and the second fixing member 30B will be described below for convenient of explanation and a difference will be separately described.

Figure 2:
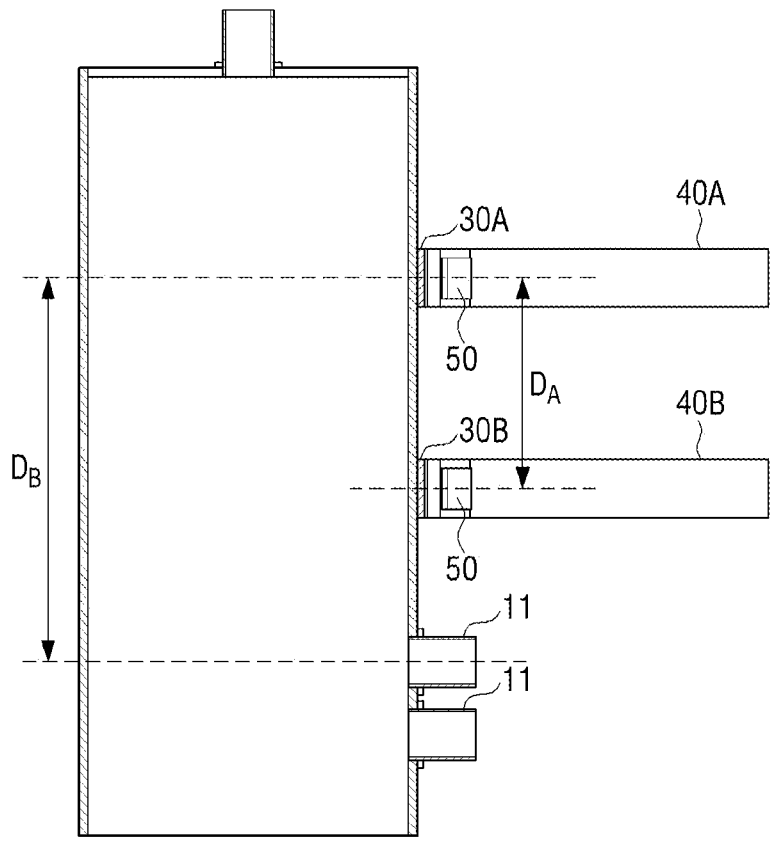
FIG. 2 is a view illustrating a position at which the accumulator fixing device for the compressor illustrated in FIG. 1 is installed.
Figure 3:
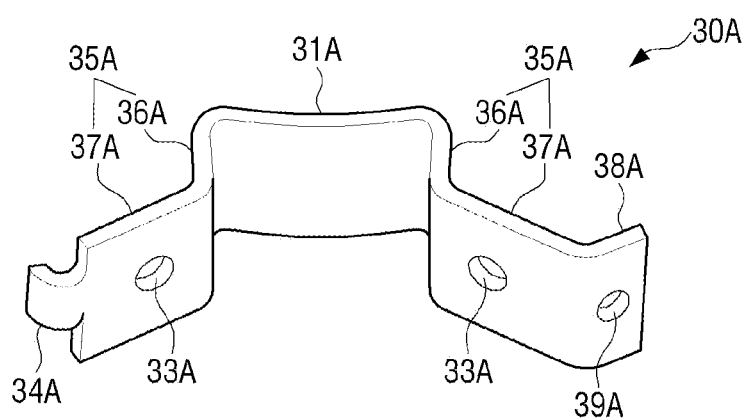
FIG. 3 is an enlarged view of a first fixing member illustrated in FIG. 2.

FIG. 3 is an enlarged view of a first fixing member illustrated in FIG. 2. As illustrated in FIG. 3, the first fixing member 30A has a first main fixing portion 31A fixed to an outer circumferential surface of the compressor 10. Further, the first fixing member 30A may have first auxiliary fixing portions 35A each extending on opposite sides of the first main fixing portion 31A and protruding toward the accumulator 20.

The first auxiliary fixing portions 35A may have a first auxiliary vertical fixing portion 36A which is vertically connected to the first main fixing portion 31A, and a first auxiliary horizontal fixing portion 37A which is connected to the first auxiliary vertical fixing portion 36A and is in contact with the outer circumferential surface of the accumulator 20.

A first protruding portion 34A protruding toward the compressor 10 is provided to one side of the first auxiliary horizontal fixing portion 37A, and a first fastening portion 38A protruding toward the compressor 10 is provided to the other side of the first auxiliary horizontal fixing portion 37A. The first fastening portion 38A is provided with a first fastening hole 39A penetrating through the first fastening portion 38A along a thickness direction of the first fastening portion 38A.

The first protruding portion 34A may be inserted into a first catching hole 47A (FIG. 4) formed in the first supporting member 40A (FIG. 4) to be described below to be fixed thereto, and the first fastening portion 38A may be in communication with a first coupling hole 49A formed in the first supporting member 40A to be coupled to the first coupling hole 49A by a fastener (e.g., a bolt).

A first installing hole 33A penetrates through the first auxiliary horizontal fixing portion 37A along a thickness direction of the first auxiliary horizontal fixing portion 37A. An anti-vibration member 50 to be described below is installed in the first installing hole 33A, thereby making it possible to minimize vibration of the compressor 10 transferred to the accumulator 20. The anti-vibration member 50 will be described in detail with reference to the following drawings.

Further, the first fixing member 30A has a width of 40% or less based on the distance between the first fixing member 30A and the inlet port 11, such that the first fixing member 30A and the second fixing member 30B are disposed to be spaced apart from each other. The second fixing member 30B has a structure corresponding to the first fixing member 30A and is fixed to the compressor so as to be downwardly spaced apart from the first fixing member 30A by a predetermined interval.

Figure 4:
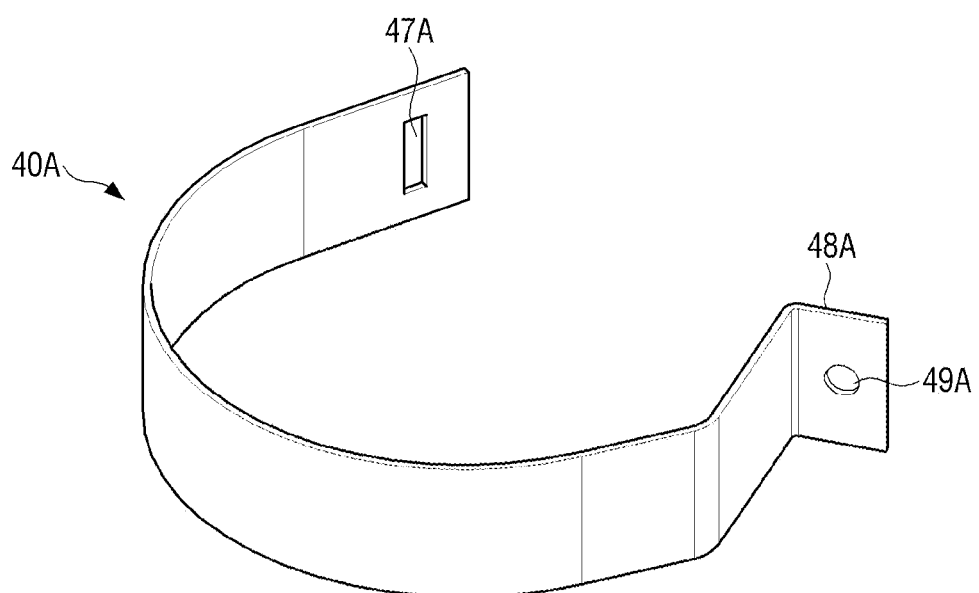
FIG. 4 is an enlarged view of a first supporting member illustrated in FIG. 2.

FIG. 4 is an enlarged view of a first supporting member illustrated in FIG. 2. As illustrated in FIG. 4, the first supporting member 40A has a structure that surrounds an outer circumferential surface of the accumulator 20 and is fastened to the first fixing member 30A. For example, a first catching hole 47A that protrudes toward the accumulator 20 and is fixed to the first protruding portion 34A is formed at one side of the first supporting member 40A.

The other side of the first supporting member 40A has a first coupling portion 48A bent to opposite to the first fastening portion 38A. The first coupling portion 48A has a first coupling hole 49A formed in a position corresponding to the first fastening hole 39A. The first fastening hole 39A and the first coupling hole 49A may have a screw thread formed therein, and the fastener (bolt) may be inserted into the first fastening hole 39a and the first coupling hole 49A to couple the first supporting member and the first fixing member to each other.

The first supporting member 40A may have one or more bending portions formed to have elastic force by bending one side thereof. A thickness of the first supporting member 40A may be 1 to 5T. Further, the first supporting member 40A may be formed of any one of cold rolled steel, hot rolled steel, stainless, and a steel based material, or an alloy material thereof, and plating or coating may be added onto a surface of the first supporting member 40A.

FIGS. 5A to 5D illustrate various modified examples of the first supporting member illustrated in FIG. 4.

Figure 5A:
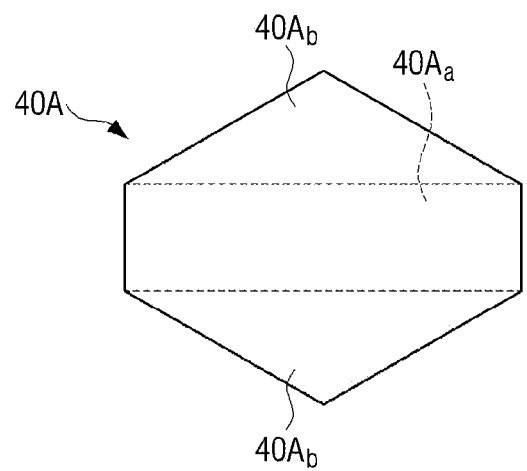
FIGS. 5A to 5D illustrate various modified examples of the first supporting member illustrated in FIG. 4.
Figure 5B:
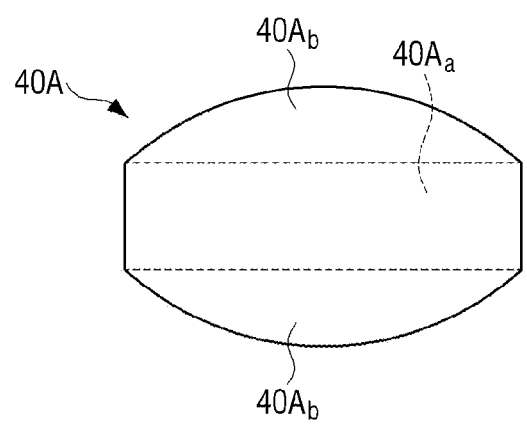

FIGS. 5A and 5B are front views illustrating first and second modified examples of the first supporting member. As illustrated in FIGS. 5A and 5B, the first supporting member 40A may have a shape in which a cross-sectional area is increased toward a central portion thereof. The first supporting member 40A may have a first supporting body 40Aa and a first supporting wing 40Ab having a shape bent toward a central portion of the first supporting body 40Aa. Meanwhile, the first supporting wing 40Ab may have a triangular shape illustrated in FIG. 5A and may have an oval shape as illustrated in FIG. 5B. Meanwhile, the first supporting wing 40Ab may be modified in various forms in which a cross-sectional area of the first supporting body 40Aa is increased.

That is, the first supporting member may increase a contact area with the accumulator 20 by the first supporting wing 40Ab. Therefore, the vibration transferred from the compressor 10 to the accumulator 20 is reduced, thereby making it possible to prevent damage on the inlet port 11 occurring by the vibration of the accumulator 20 and to minimize the noise.

Figure 5C:
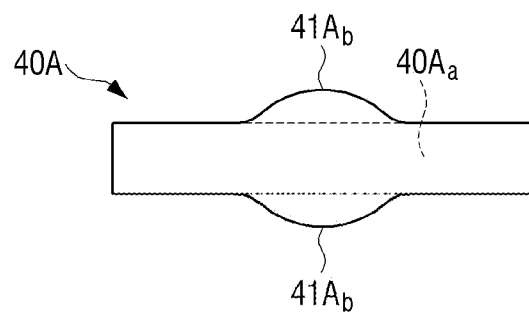
Figure 5D:
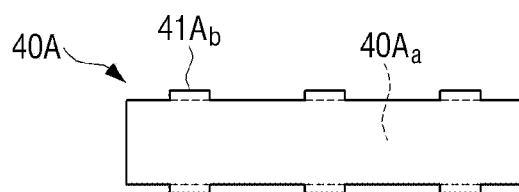

FIGS. 5C and 5D are front views illustrating third and fourth modified examples of the first supporting member. The first supporting member may have a convex portion 41Ab protruding along a width direction of the first supporting body 40Aa of the first supporting member 40A. Although not illustrated in FIG. 5C, the convex portion 41Ab may be a half circle type disposed at a central portion of the first supporting body 40Aa, and although not illustrated, a plurality of convex portions 41Ab may be arranged along a length direction of the first supporting body 40Aa.

Further, as illustrated in FIG. 5D, the convex portions 41Ab may be replaced with a quadrangular shape, and may also be disposed to be spaced apart from each other by a predetermined interval, as described above.

Meanwhile, a shape of the first supporting member 40A may have a shape increasing the contact area with the accumulator 20, and may be modified to various shapes other than the modified examples described above.

Figure 6:
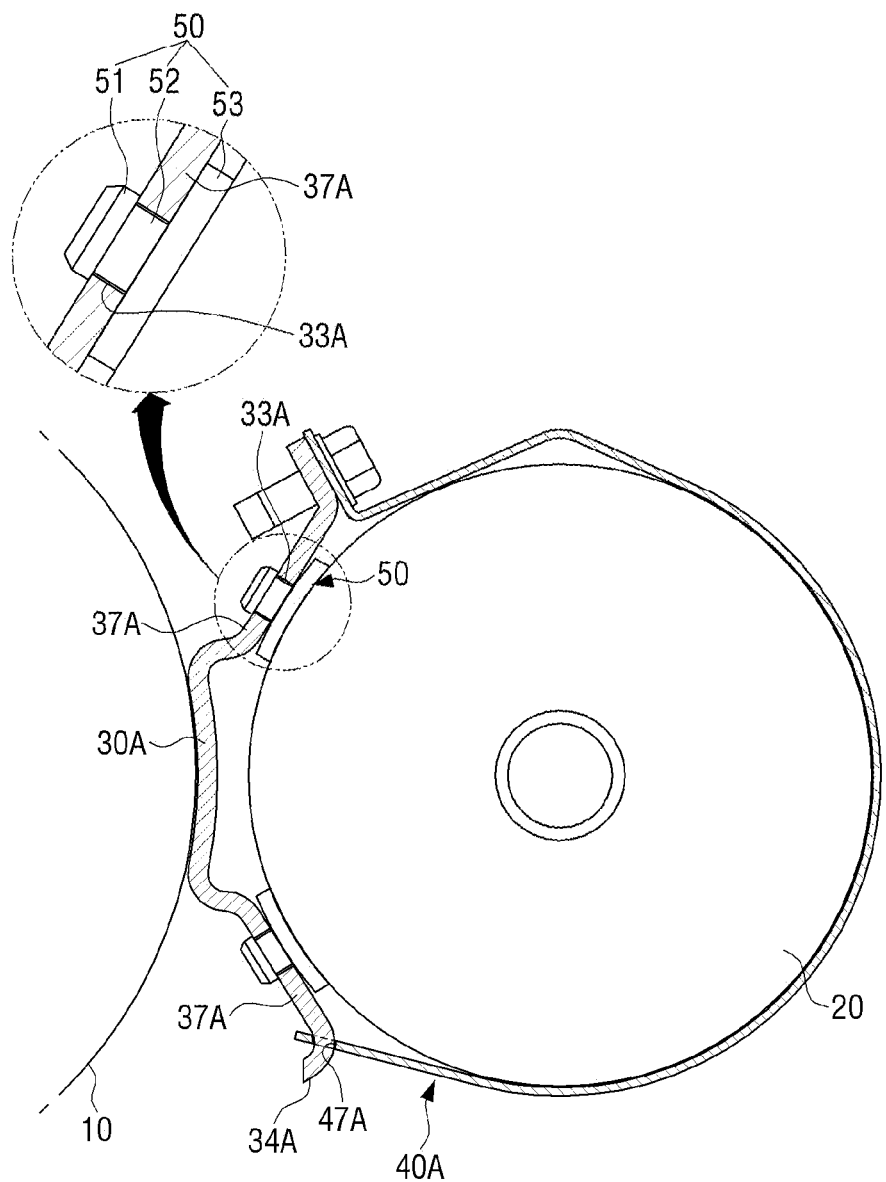
FIG. 6 is a plan view of the accumulator fixing device for the compressor illustrated in FIG. 2.

FIG. 6 is a plan view of the accumulator fixing device for the compressor illustrated in FIG. 2. As illustrated in FIG. 6, the anti-vibration member 50 has an upper fixing portion 51 inserted into the first installing hole 33A penetrating through the first auxiliary horizontal fixing portion 37A along the thickness direction of the first auxiliary horizontal fixing portion 37A and insertedly fixed to the first installing hole 33A. Further, the anti-vibration member 50 has a lower fixing portion 53 which is connected to the upper fixing portion and is closely in contact with the outer circumferential surface of the accumulator, and a connection fixing portion 52 connecting the upper fixing portion 51 and the lower fixing portion 53 to each other.

The upper fixing portion 51 has an outer diameter greater than the first installing hole 33A, and the upper fixing portion 51 penetrates through the first installing hole 33A to protrude to the outside. The connection fixing portion 52 has an outer diameter smaller than the upper fixing portion 51, and is disposed on the first installing hole 33A. The lower fixing portion 53 has an outer diameter greater than the connection fixing portion 52, and may preferably have a cross-sectional area corresponding to the first auxiliary horizontal fixing portion 37A so as to be easily in contact with the accumulator 20.

The anti-vibration member 50 may be formed of an elastic material, and for example, the anti-vibration member 50 may be formed of rubber or silicon. That is, as the anti-vibration member 50 is interposed between the first fixing member 30A and the accumulator 20, a state in which the anti-vibration member 50 is closely in contact with the accumulator 20 may be maintained from humidity generated according to a temperature difference of the accumulator 20. Further, the anti-vibration member 50 may effectively absorb the noise and vibration transferred to the accumulator 20 from the compressor 10, and may extend a lifespan of the compressor 10 and the accumulator 20.

Figure 7:
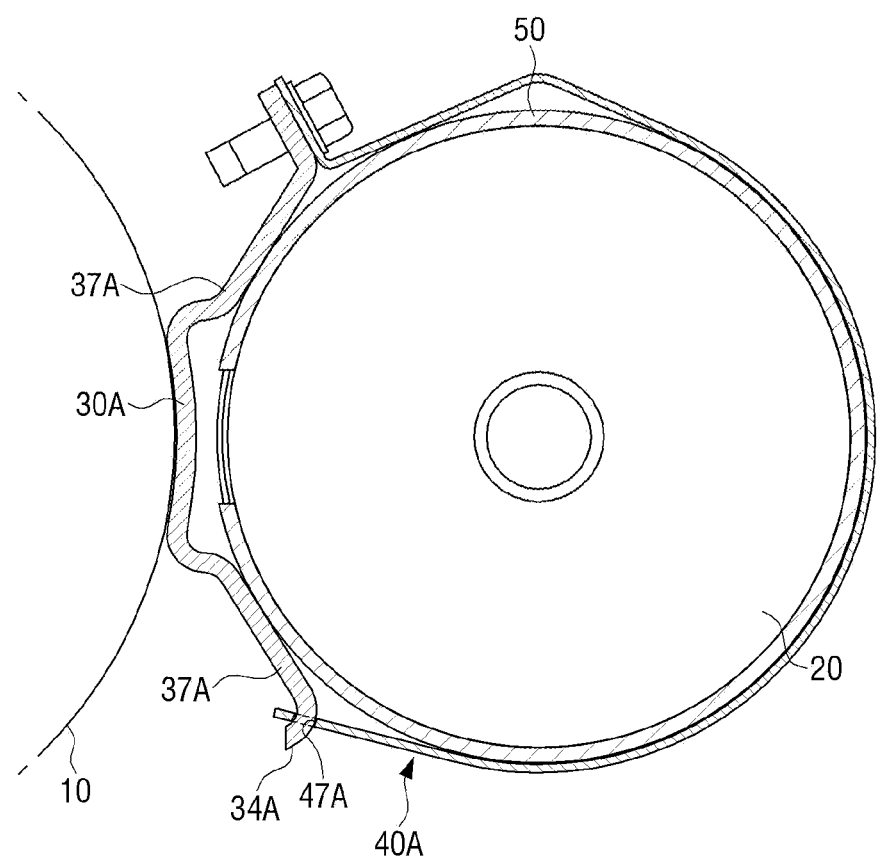
FIG. 7 is a plan view of an accumulator fixing device for a compressor according to a second exemplary embodiment of the present disclosure.
Figure 8:
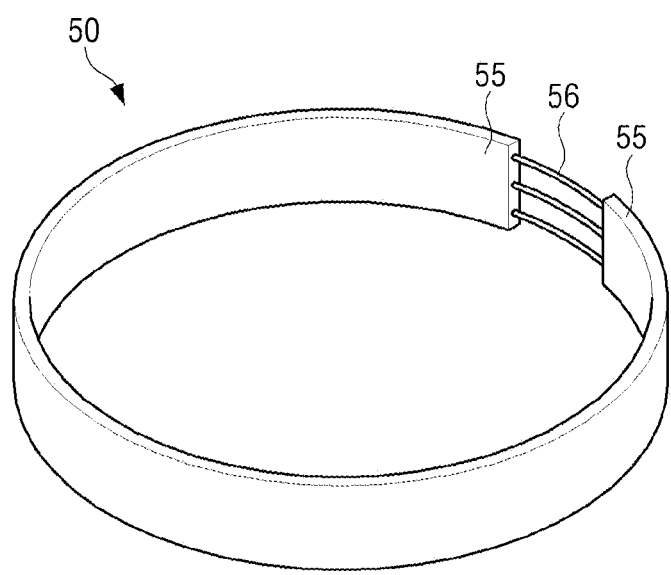
FIG. 8 is an enlarged view of an anti-vibration member illustrated in FIG. 7.

FIG. 7 is a plan view of an accumulator fixing device for a compressor according to a second exemplary embodiment of the present disclosure and FIG. 8 is an enlarged view of an anti-vibration member illustrated in FIG. 7. Other exemplary embodiment below will be described based on differences with the accumulator fixing device for the compressor described in FIGS. 1 to 6, and an omitted description will be replaced with the contents of the accumulator fixing device for the compressor described in FIGS. 1 to 6.

As illustrated in FIG. 7, the anti-vibration member 50 may have a ring shape interposed between the accumulator 20 and the first supporting member 40A. The anti-vibration member 50 is disposed on most of the contact surfaces between the accumulator 20 and the first supporting member 40A, and between the accumulator 20 and the first fixing member 30A, thereby making it possible to absorb vibration and noise and to effectively prevent the vibration from being transferred.

For example, as illustrated in FIG. 8, the anti-vibration member 50 may include an anti-vibration body 55, and a connection band 56 connecting both ends of the anti-vibration body 55 to each other. The connection band 56 may be disposed to opposite to the first main fixing portion 31A spaced apart from the accumulator 20.

Figure 9:
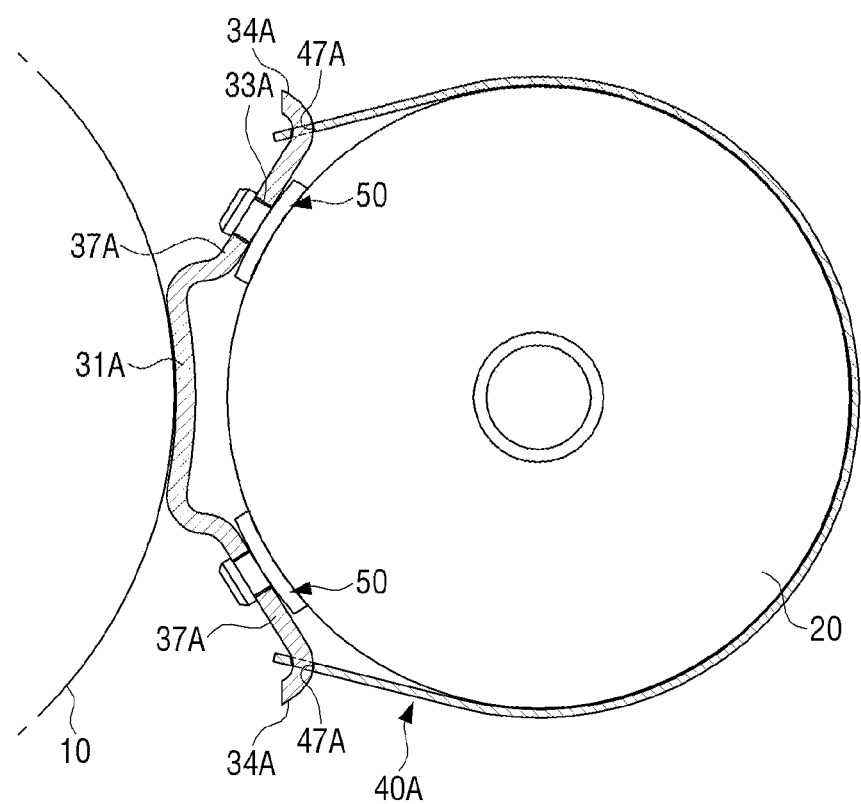
FIG. 9 is a plan view of an accumulator fixing device for a compressor according to a third exemplary embodiment of the present disclosure.

FIG. 9 is a plan view of an accumulator fixing device for a compressor according to a third exemplary embodiment of the present disclosure. As illustrated in FIG. 9, first protruding portions 34A protruding toward the compressor may be each formed at opposite sides of the first auxiliary horizontal fixing portion 37A. First catching holes 47A that each protrude toward the accumulator 20 and are each fixed to the first protruding portions 34A may be formed at opposite sides of the first supporting member 40A. That is, each of the first protruding portions 34A is inserted and fixed into each of the first catching holes 47A, such that the first supporting member 40A may be easily fastened to the first fixing member 30A.

Figure 10:
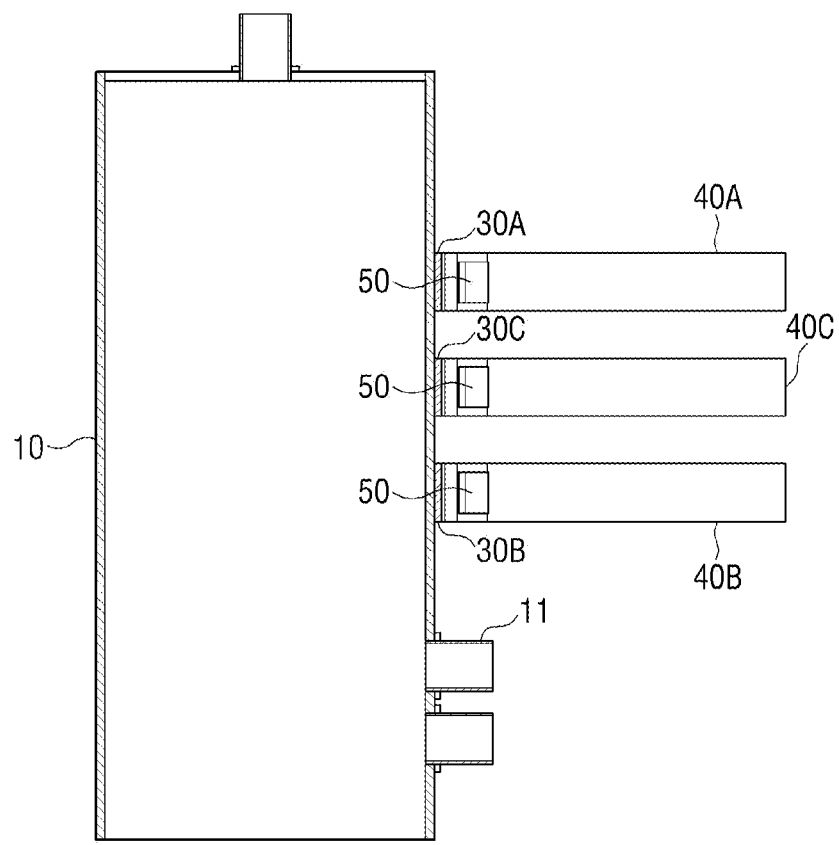
FIG. 10 is a front view of an accumulator fixing device for a compressor according to a fourth exemplary embodiment of the present disclosure.

FIG. 10 is a front view of an accumulator fixing device for a compressor according to a fourth exemplary embodiment of the present disclosure. As illustrated in FIG. 10, the accumulator fixing device for the compressor may further include a third fixing member 30C disposed between the first fixing member 30A and the second fixing member 30B and fixed to the compressor.

Further, the accumulator fixing device for the compressor may further include a third supporting member 40C which is fastenable to opposite sides of the third fixing member 30C and is disposed to surround a circumference of the accumulator 20. In this case, a distance between the first fixing member 30A and third fixing member 30C, and a distance between the third fixing member 30C and the second fixing member 30B may be the same as each other, and a distance between the first fixing member 30A and the second fixing member 30B may be 20% to 80% or less of the distance between the first fixing member 30A and the inlet port 11.

Figure 11:
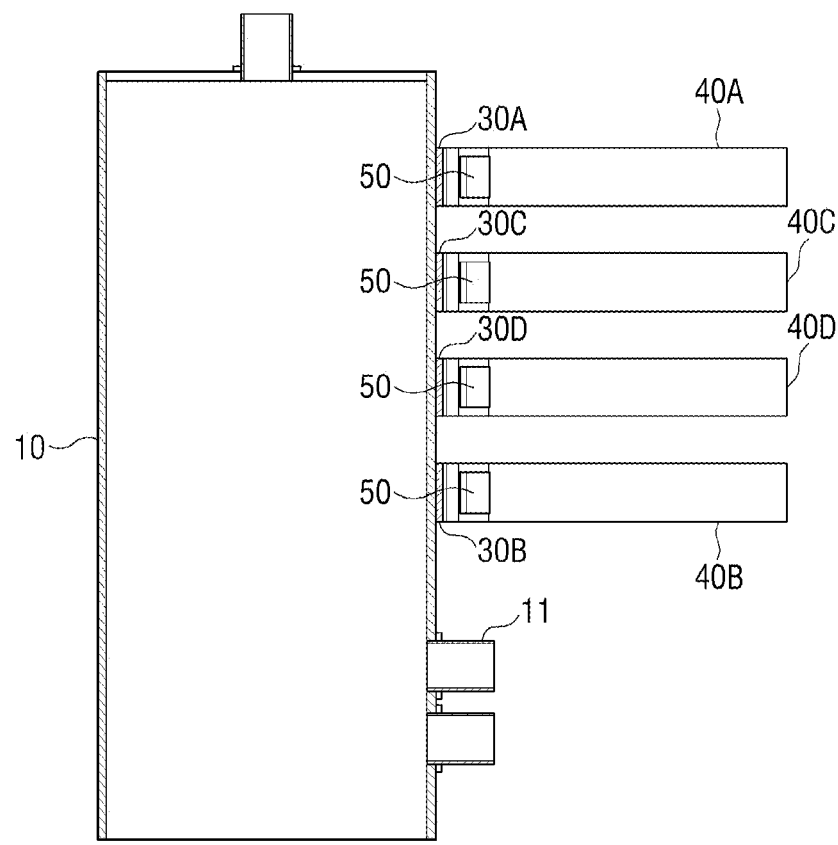
FIG. 11 is a front view of an accumulator fixing device for a compressor according to a fifth exemplary embodiment of the present disclosure.

FIG. 11 is a front view of an accumulator fixing device for a compressor according to a fifth exemplary embodiment of the present disclosure. As illustrated in FIG. 11, the accumulator fixing device for the compressor may further include the third fixing member 30C and a fourth fixing member 30D disposed between the first fixing member 30A and the second fixing member 30B and each fixed to the compressor 10.

Further, the accumulator fixing device for the compressor may further include the third supporting member 40C and a fourth supporting member 40D which are each fastenable to opposite sides of the third fixing member 30C and the fourth fixing member 30D and are disposed to surround the circumference of the accumulator 20. In this case, the distances between the respective fixing members may be the same as each other, and the distance between the first fixing member 30A and the second fixing member 30B may be 20% to 80% or less of the distance between the first fixing member 30A and the inlet port 11.

Figure 12:
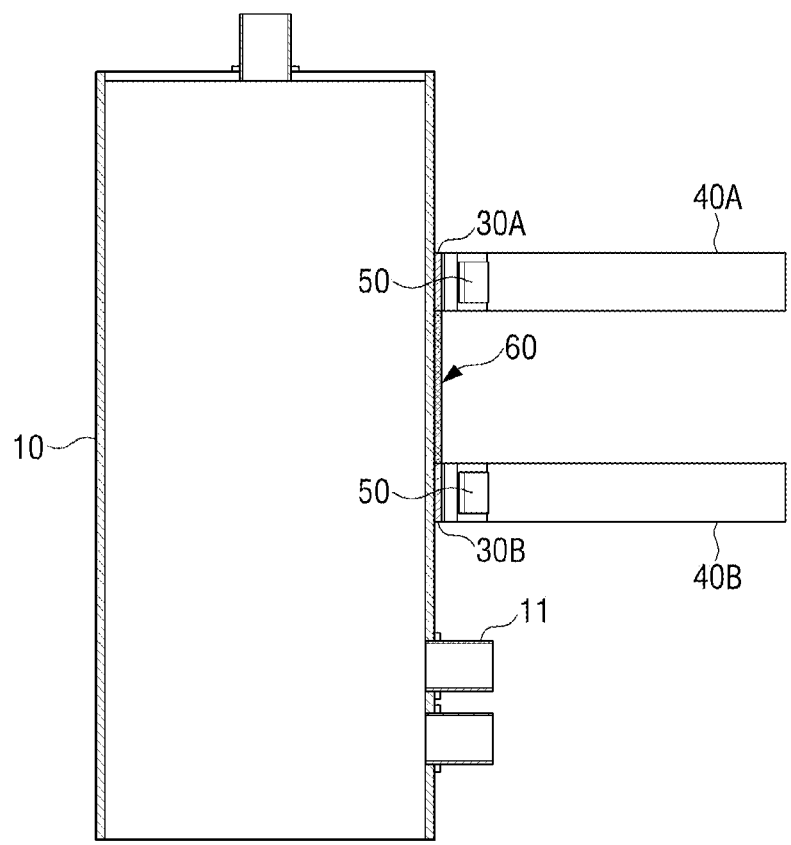
FIG. 12 is a front view of an accumulator fixing device for a compressor according to a sixth exemplary embodiment of the present disclosure.

FIG. 12 is a front view of an accumulator fixing device for a compressor according to a sixth exemplary embodiment of the present disclosure. As illustrated in FIG. 12, the accumulator fixing device for the compressor may further include a connection member 60 connecting the first fixing member 30A and the second fixing member 30B to each other. The connection member 60 may be disposed between a lower end portion of the first fixing member 30A and an upper end portion of the second fixing member 30B and be fixed to the compressor 10. Meanwhile, the first fixing member 30A and the second fixing member 30B may be manufactured in an integral type using the connection member 60.

Figure 1:
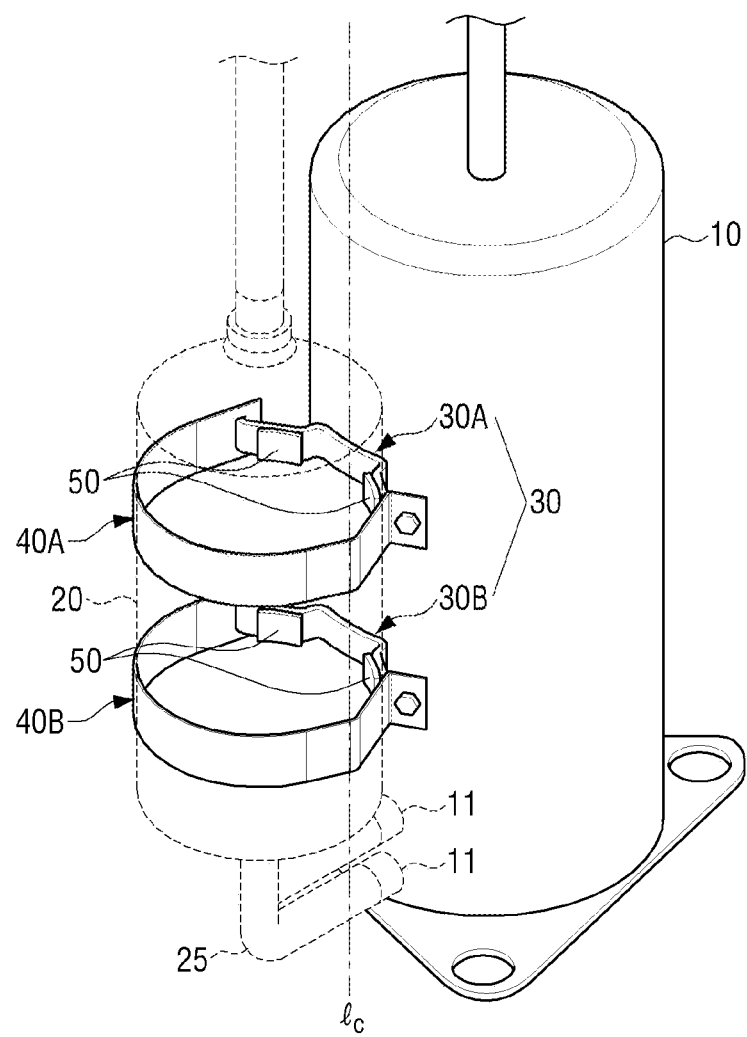
FIG. 1 is a view schematically illustrating an accumulator fixing device for a compressor according to a first exemplary embodiment of the present disclosure.
Figure 13:
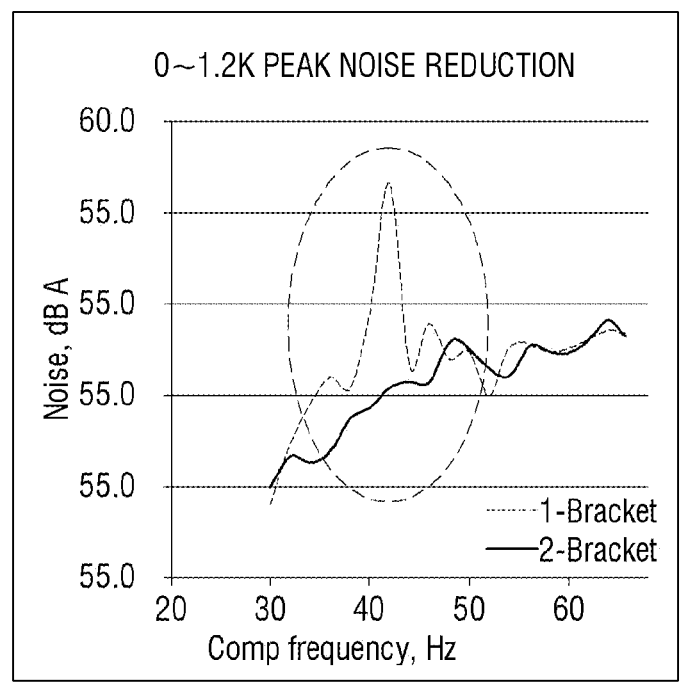
FIG. 13 is a view illustrating a noise reduction effect of the accumulator fixing device for the compressor illustrated in FIG. 1.

FIG. 13 is a view illustrating a noise reduction effect of the accumulator fixing device for the compressor illustrated in FIG. 1. As illustrated in FIG. 13, a noise reduction effect according to an exemplary embodiment of the present disclosure is verified through an experiment measured during an operation of the compressor 10.

As compared to a conventional one fixing structure fixing the accumulator, it may be seen that the accumulator fixing device for the compressor according to the present disclosure reduces peak noise of about 9.28 dB based on 40 rps.

Figure 14:
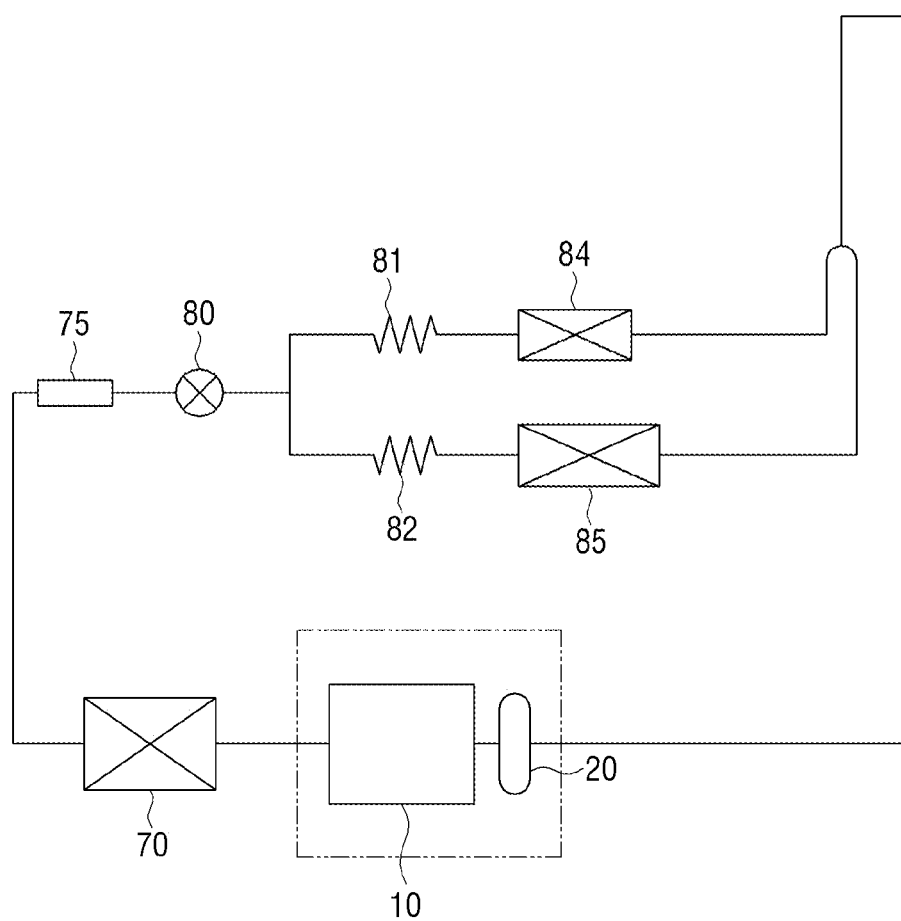
FIG. 14 is a view illustrating an air-conditioning apparatus in which the accumulator fixing device for the compressor illustrated in FIG. 1 is installed.

FIG. 14 is a view illustrating an air-conditioning apparatus in which the accumulator fixing device for the compressor illustrated in FIG. 1 is installed. As illustrated in FIG. 14, a refrigeration cycle of an air-conditioning apparatus 100 includes the compressor 10 that compresses a vapor refrigerant of a low temperature and low pressure into a vapor refrigerant of a high temperature and high pressure. Further, the air-conditioning apparatus 100 includes a condenser 70 that condenses the refrigerant supplied from the compressor 10 into a liquid refrigerant, and includes a refrigerant branch valve 80 at which the refrigerant passing through the condenser 70 is branched, and an auxiliary expansion appliance 81 and a main expansion appliance 82 that expand the refrigerant transferred from the condenser 70.

Further, the air-conditioning apparatus 100 includes an auxiliary evaporator 84 and a main evaporator 85 that cool surrounding air while the refrigerant supplied from the auxiliary expansion appliance 81 and the main expansion appliance 82 is evaporated. Further, the air-conditioning apparatus 100 includes a drier 75 provided on a refrigerant line connecting the main evaporator 85, the condenser 70, and the expansion appliances 81 and 82 to each other to remove moisture included in the refrigerant supplied from the condenser 70. In addition, the air-conditioning apparatus 100 may include the accumulator 20 provided between the evaporators 84 and 85 and the condenser 10 to prevent the liquid refrigerant from being introduced into the compressor 10.

In this case, in a case in which the refrigerant of the liquid state which is not evaporated in the process of introducing the refrigerant passing through the evaporators 84 and 85 of the refrigeration cycle apparatus is introduced into the compressor 10 is introduced into the compressor 10, abnormal explosion noise occurs in the compressor 10. In order to prevent such a phenomenon, the accumulator 20 for evaporating the refrigerant of the liquid state or preventing an impurity introduction before the refrigerant passing through the evaporators 84 and 85 is introduced into the compressor 10 is mounted.

The accumulator 20 may be installed to be positioned at a side of the compressor 10, and the accumulator 20 is installed to be connected to the compressor 10 by a connection pipe 25 (FIG. 1). Moreover, in order to prevent the vibration occurring during the operation of the compressor 10, the compressor 10 and the accumulator 20 may be fixed using the accumulator fixing device for the compressor according to the present disclosure.

Therefore, the air-conditioning apparatus may be used in the compressor 10 used in an air conditioner, a refrigerator, or the like, and the noise and vibration occurring during the operation of the compressor 10 may be effectively reduced. Further, it is possible to pleasantly keep an indoor or freshly keep the foods by preventing damage on the connection pipe 25 of the accumulator 20 due to the vibration.

As described above, although the present disclosure has been described with reference to the embodiments and the accompanying drawings, it is to be understood that the present disclosure is not limited thereto, and various variations and modifications may be made by those skilled in the art without departing from the spirit and scope of the present disclosure as defined by the appended claims.

The invention claimed is:

1. An accumulator fixing device for a compressor, the accumulator fixing device comprising:
   a first bracket and a second bracket that are fixed to an outer surface of the compressor;
   a first strap configured to fix one portion of an accumulator while surrounding a circumference of the accumulator together with the first bracket; and
   a second strap configured to fix another portion of the accumulator while surrounding the circumference at the other portion of the accumulator together with the second bracket,
   wherein:

the first strap and the second strap are disposed to be spaced apart from each other by a predetermined interval, the first bracket is fastened to opposite sides of the first strap, the second bracket is fastened to opposite sides of the second strap and disposed to be spaced apart from the first bracket along a length direction of the compressor, the compressor includes an inlet port into which a fluid is introduced from the accumulator, the first strap is disposed above the second strap, and a distance between the first bracket and the second bracket is 20% to 80% of a length between the first bracket and the inlet port.

2. The accumulator fixing device of claim 1, wherein the first bracket and the second bracket are disposed on a virtual line disposed along the length direction of the compressor.

3. The accumulator fixing device of claim 1, wherein:
the first bracket includes:
a first main fixing portion fixed onto an outer circumferential surface of the compressor; and
first auxiliary fixing portions each extending from opposite sides of the first main fixing portion and protruding toward the accumulator, and
the second bracket includes:
a second main fixing portion fixed onto the outer circumferential surface of the compressor; and
second auxiliary fixing portions each extending from opposite sides of the second main fixing portion and protruding toward the accumulator.

4. The accumulator fixing device of claim 3, wherein:
the first auxiliary fixing portions include:
a first auxiliary vertical fixing portion which is vertically connected to the first main fixing portion; and
a first auxiliary horizontal fixing portion which is connected to the first auxiliary vertical fixing portion and is in contact with the outer circumferential surface of the accumulator, and
the second auxiliary fixing portions include:
a second auxiliary vertical fixing portion which is vertically connected to the second main fixing portion; and
a second auxiliary horizontal fixing portion which is connected to the second auxiliary vertical fixing portion and is in contact with the outer circumferential surface of the accumulator.

5. The accumulator fixing device of claim 4, wherein:
one of the first auxiliary fixing portions are disposed at one side of the first main fixing portion and includes a first protruding portion connected to the first auxiliary horizontal fixing portion and protruding toward the compressor,
another of the first auxiliary fixing portions are disposed at another side of the first main fixing portion and includes a first fastening portion protruding toward the compressor and connected to the first auxiliary horizontal fixing portion and having a first fastening hole penetrating through the first fastening portion along a thickness direction of the first fastening portion,
one of the second auxiliary fixing portions disposed at one side of the second bracket and includes a second protruding portion connected to the second auxiliary horizontal fixing portion and protruding toward the compressor, and
another of the second auxiliary fixing portions disposed at another side of the second bracket and includes a second fastening portion protruding toward the compressor and connected to the second auxiliary horizontal fixing portion and having a second fastening hole penetrating through the second fastening portion along a thickness direction of the second fastening portion.

6. The accumulator fixing device of claim 5, wherein:
a first catching hole protruding toward the accumulator and fixed to the first protruding portion is formed at one side of the first strap, and another side of the first strap includes a first coupling portion bent to opposite to the first fastening portion and having a first coupling hole corresponding to the first fastening hole, and
a second catching hole protruding toward the accumulator and fixed to the second protruding portion is formed at one side of the second strap, and another side of the second strap includes a second coupling portion bent to opposite to the second fastening portion and having a second coupling hole corresponding to the second fastening hole.

7. The accumulator fixing device of claim 4, wherein:
the first auxiliary horizontal fixing portion includes first protruding portions each connected to one side and another side of the first auxiliary horizontal fixing portion and protruding toward the compressor,
the second auxiliary horizontal fixing portion includes second protruding portions each connected to one side and another side of the second auxiliary horizontal fixing portion and protruding toward the compressor,
first catching holes each protruding toward the accumulator and each fixed to the first protruding portions are formed in one side and another side of the first strap, and
second catching holes each protruding toward the accumulator and each fixed to the second protruding portions are formed in one side and another side of the second strap.

8. The accumulator fixing device of claim 3, further comprising an anti-vibration member configured to have a first upper fixing portion inserted and fixed into a first installing hole penetrating through the first auxiliary fixing portions along a thickness direction of the first auxiliary fixing portions, and a first lower fixing portion which is connected to the first upper fixing portion and is closely in contact with the outer circumferential surface of the accumulator.

9. The accumulator fixing device of claim 1, wherein a width of the first bracket is 40% or less of a distance between the first bracket and the inlet port.

10. The accumulator fixing device of claim 1, wherein thicknesses of the first strap and the second strap are 1 to 5T.

11. The accumulator fixing device of claim 1, wherein:
the first bracket is fastened to opposite sides of the first strap;
the second bracket is spaced apart from the first bracket and fastened to opposite sides of the second strap; and
connection members each connected between the first bracket and the second bracket and fixed onto an outer circumferential surface of the compressor.

12. An air-conditioning apparatus comprising:
a compressor;
a condenser configured to condense a refrigerant introduced from the compressor;
an evaporator configured to cool surrounding air using evaporated latent heat of the refrigerant introduced from the condenser;
an accumulator configured to provide the refrigerant of a vapor state to the compressor; and an accumulator fixing device for the compressor configured to fix the accumulator and the compressor to each other, wherein the accumulator fixing device for the compressor includes:
- a first bracket and a second bracket that are fixed to an outer surface of the compressor,
- a first strap configured to fix one portion of the accumulator while surrounding a circumference of the accumulator together with the first bracket, and
- a second strap configured to fix another portion of the accumulator while surrounding the circumference at the other portion of the accumulator together with the second bracket, and wherein:
- the first strap and the second strap are disposed to be spaced apart from each other by a predetermined interval,
- the compressor includes an inlet port into which a fluid is introduced from the accumulator,
- the first bracket is fastened to opposite sides of the first strap,
- the second bracket is fastened to opposite sides of the second strap and disposed to be spaced apart from the first bracket along a length direction of the compressor,
- the first strap is disposed above the second strap, and
- a distance between the first bracket and the second bracket is 20% to 80% of a length between the first bracket and the inlet port.

* * * * *